F. B. MORSE.
Thill-Coupling.
No. 52,440.
Patented Feb 6, 1866.
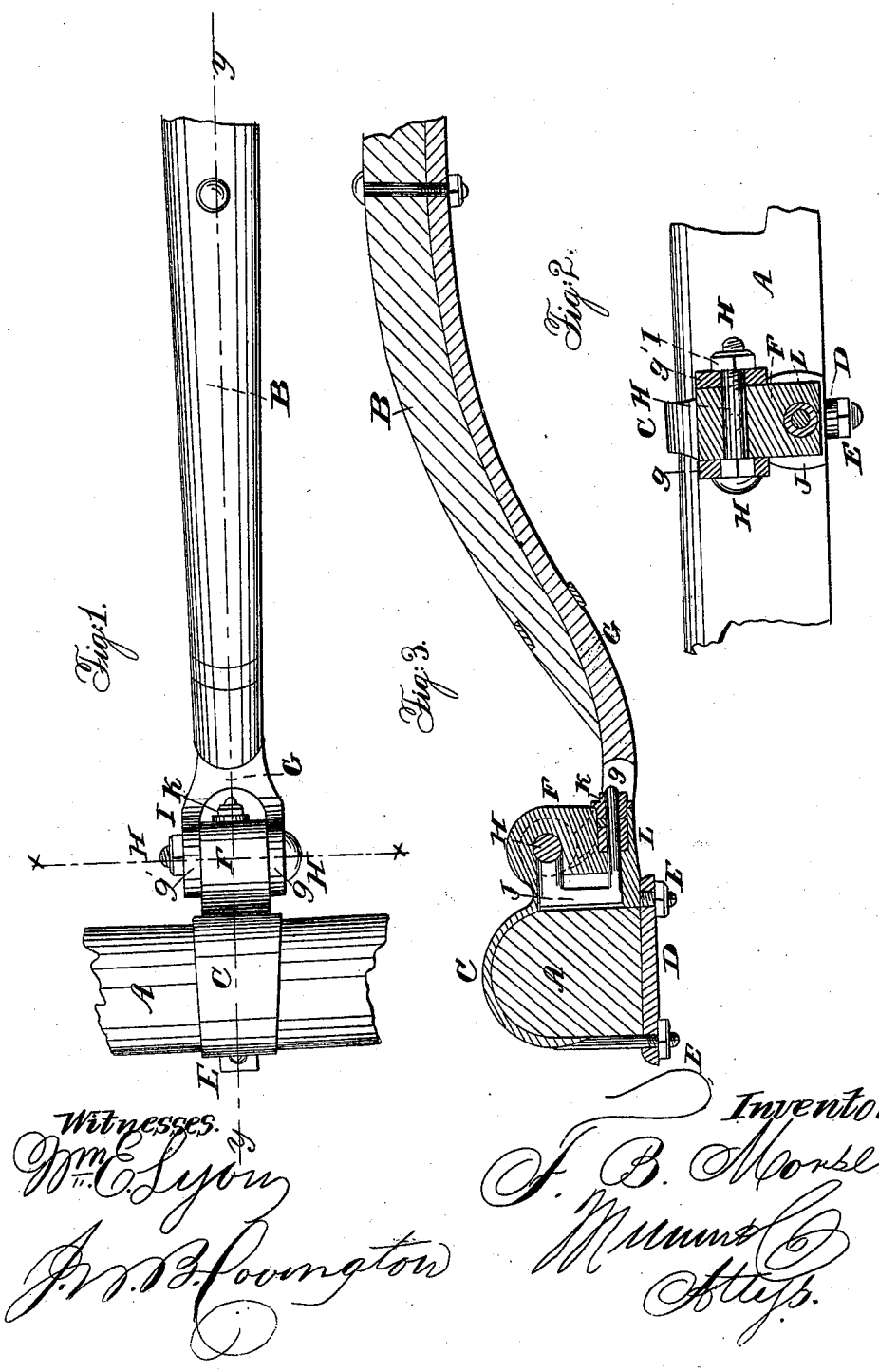

UNITED STATES PATENT OFFICE.

FRANCIS B. MORSE, OF MILWAUKEE, WISCONSIN.

IMPROVEMENT IN CARRIAGE-CLIPS.

Specification forming part of Letters Patent No. 52,440, dated February 6, 1866.

*To all whom it may concern:*

Be it known that I, FRANCIS B. MORSE, of Milwaukee, in the county of Milwaukee and State of Wisconsin, have invented a new and useful Improvement in Carriage-Clips; and I do hereby declare that the following is a full, clear, and exact description thereof, which will enable others skilled in the art to make and use the same, reference being had to the accompanying drawings, forming part of this specification, in which—

Figure 1 is a top or plan view of my improved clip. Fig. 2 is a vertical cross-section through the line $x x$, Fig. 1. Fig. 3 is a vertical longitudinal section through the line $y y$, Fig. 1.

Similar letters of reference indicate like parts.

The object of my invention is to furnish a carriage-clip which will couple the carriage thills or pole securely to the axle and hold it there without rattling, and which shall be neater in appearance, less liable to get out of order, require less metal, and can be manufactured at less expense than the clips commonly in use; and it consists in forming the clip and in combining therewith an anti-rattler, as hereinafter more fully described.

A is a portion of the axle to which the clip is attached. B is a portion of one of the thills connected to the axle A by the clip. C is the band or part of the clip that passes around the axle A. Upon the lower ends of the arms of the band C are formed bolts, over which passes the piece D, which is screwed down upon the lower side of the axle A, holding the band C close down upon the upper part of the axle, and at the same time drawing the arms of the said band closely against the sides of the axle by means of the nuts E.

Upon the front of the band C, and solid with it, is formed the projection F, to which the thills B are attached or pivoted.

The thill-iron G, which connects the wooden part B of the thill to the clip, divides into two arms, $g$ and $g'$, one of which passes on each side of the projection F, to which it is secured by the bolt H. The part of the bolt H which passes through the arm $g$ is made square, as shown, in order to prevent the revolution of the bolt and the consequent working off of the nut I.

The projection F is chambered, as represented in Fig. 3, one branch of the chamber opening into the hole through which the bolt H passes, and the other branch passing out at the front of the projection. In this chamber is placed the anti-rattler J, which is made with two arms projecting at right angles to the main body of the anti-rattler. The end of the upper arm is hollowed out to fit upon the bolt H, as represented in Fig. 3, and the other arm extends out through the lower branch of the chamber and has a screw-thread cut upon it for the reception of the nut K. The outer end of the nut K is made square to enable it to be grasped by the wrench. The inner end is made circular to fit into the enlargement of the lower branch of the chamber in the projection F, and it is provided with a flange to more securely close the opening into the chamber.

L is a rubber spring placed around the lower arm of the anti-rattler J and compressed between the nut K and the bottom of the enlargement of the lower branch of the chamber in the projection F.

When the thills have been attached to the clip, by screwing up the nut K the upper end of the anti-rattler J is drawn forward against the bolt H and prevents rattling. By the same operation the rubber spring L is compressed, and as the parts wear by its elasticity it keeps the anti-rattler pressed up against the bolt H. The rubber spring L is so placed and protected that it will retain its elasticity indefinitely; but it can easily be replaced by removing the nut K if it should ever be necessary.

Among the advantages of my invention may be mentioned, first, that the anti-rattler J is made of metal and will consequently last as long as the other parts of the clip.

Second, the bolt H can be made large without being heavy or clumsy in appearance.

Third, when the draft-bolt H becomes worn it can be repaired and replaced by a common workman at a trifling expense.

Fourth, the anti-rattler J, pressing directly against the bolt H, prevents any movement of said bolt endwise, and thus obviates the necessity of screwing up the nut I so tightly as to cause friction between the movable arms $g$ $g'$ and the immovable projection F.

Fifth, the thills can be readily removed or attached, it being only necessary to loosen up the nut K without removing the anti-rattler J.

Having thus described my invention, I claim as new and desire to secure by Letters Patent—

1. A carriage-clip constructed substantially as described, and for the purpose set forth.

2. The combination of the anti-rattler J with the bolt H and with the clip, substantially as described, and for the purpose set forth.

The above specification of my invention signed by me this 23d day of October, 1865.

FRANCIS B. MORSE.

Witnesses:
 DE WITT DAVIS,
 JOHN C. PRATT.